Aug. 29, 1933.  D. M. SMITH ET AL  1,924,216
WATER COOLED DRUM SHAFT ASSEMBLY
Filed April 15, 1932   4 Sheets-Sheet 1
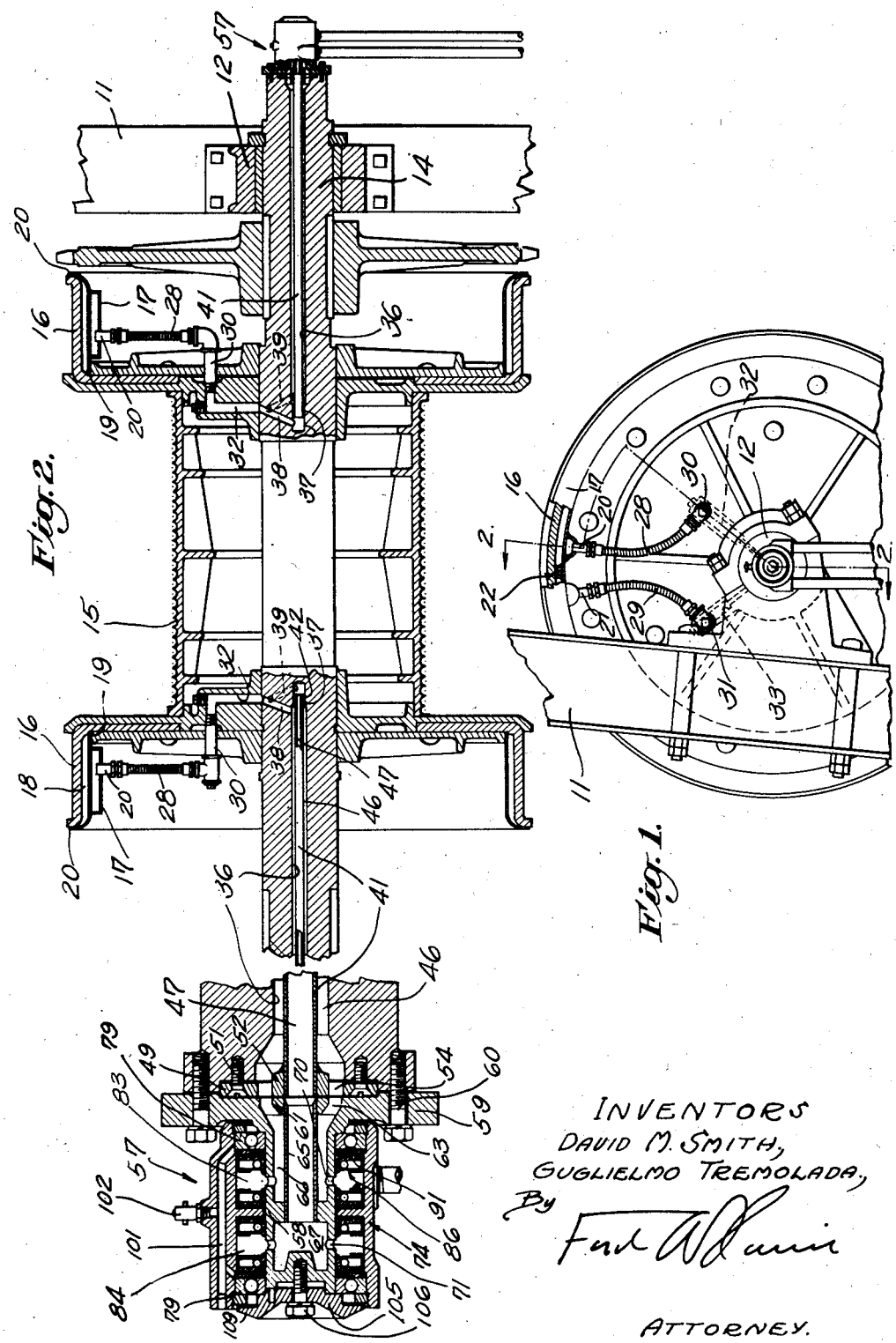
INVENTORS
DAVID M. SMITH,
GUGLIELMO TREMOLADA,
ATTORNEY.

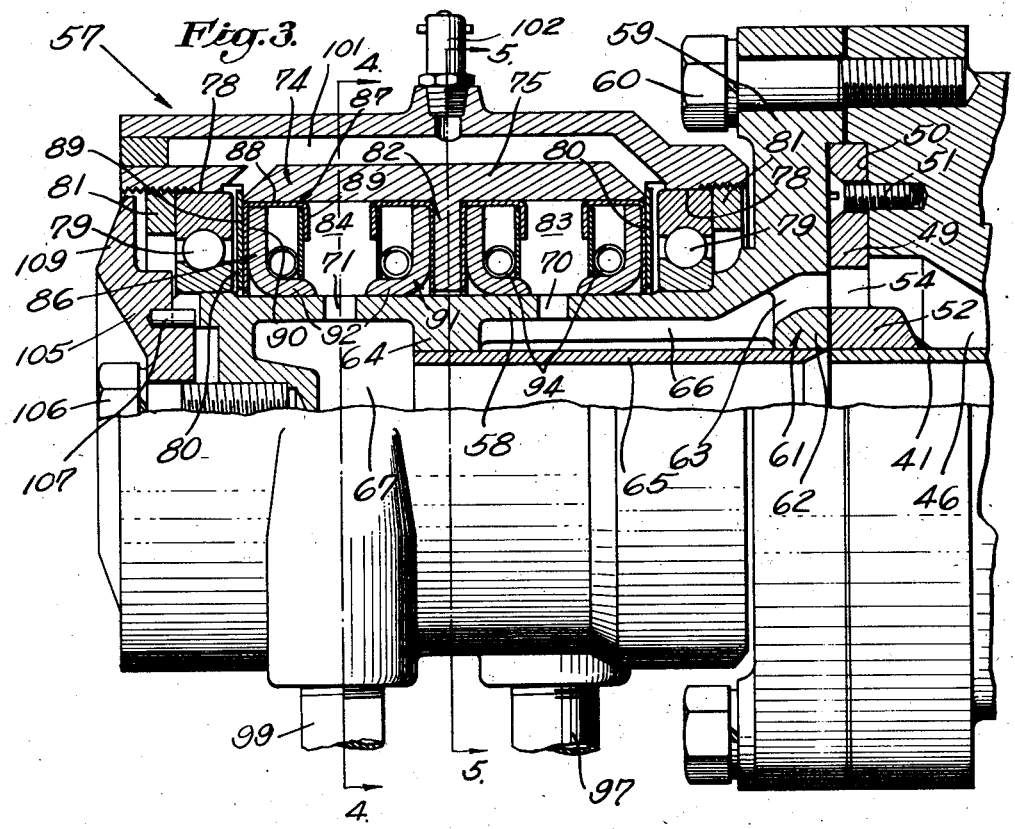
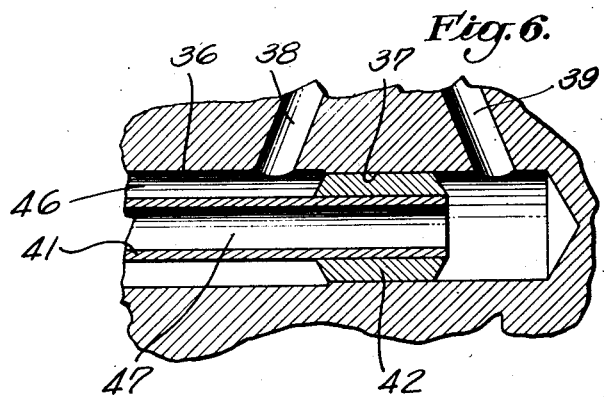

Aug. 29, 1933.  D. M. SMITH ET AL  1,924,216
WATER COOLED DRUM SHAFT ASSEMBLY
Filed April 15, 1932  4 Sheets-Sheet 3

INVENTORS:
DAVID M. SMITH,
GUGLIELMO TREMOLADA,
By
ATTORNEY.

Aug. 29, 1933.  D. M. SMITH ET AL  1,924,216
WATER COOLED DRUM SHAFT ASSEMBLY
Filed April 15, 1932  4 Sheets-Sheet 4
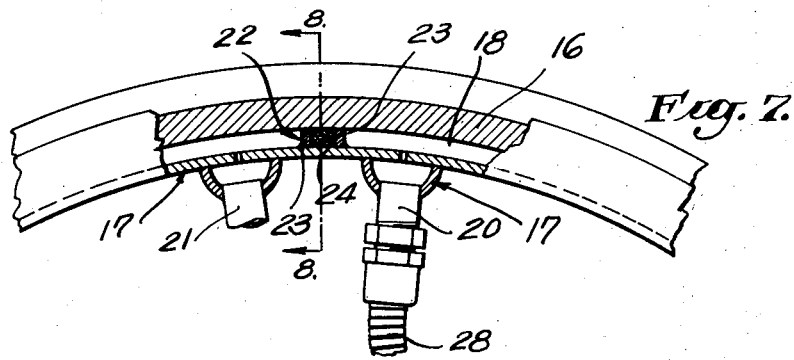
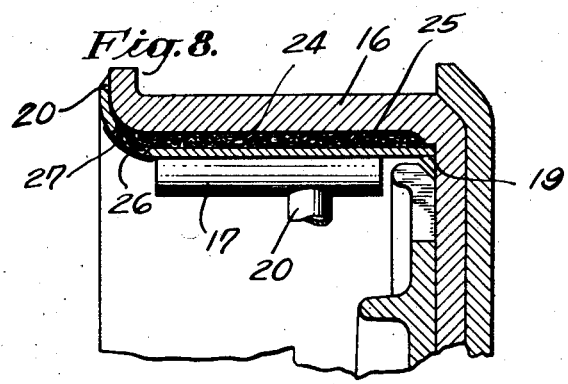
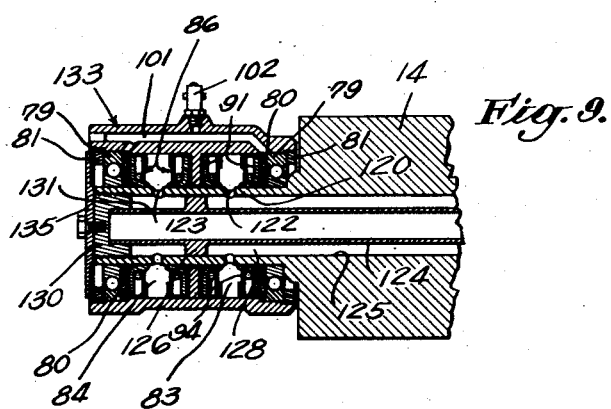
INVENTORS:
DAVID M. SMITH,
GUGLIELMO TREMOLADA,
By
ATTORNEY.

Patented Aug. 29, 1933

1,924,216

UNITED STATES PATENT OFFICE 1,924,216

WATER-COOLED DRUM SHAFT ASSEMBLY

David M. Smith and Guglielmo Tremolada, Los Angeles, Calif., assignors to Emsco Derrick & Equipment Company, Los Angeles, Calif., a Corporation of California Application April 15, 1932. Serial No. 605,462

6 Claims. (Cl. 188—264)

Our invention relates to apparatus whereby a fluid may be circulated through a fluid circulation passage, and it relates more particularly to such an apparatus wherein the fluid circulation passage is contained in a rotating structure and in which it is necessary to provide stuffing box means between the rotating structure and a stationary part whereby fluid may be directed into and withdrawn from a shaft portion of the rotating structure.

Our invention is of utility in various industries where it is desirable or necessary to circulate the fluid through a fluid circulation passage, and it has particular utility in those structures wherein a circulation or cooling liquid is desirable, such, for example, as in the logging or hoisting industry, and particularly in the oil producing industry wherein it is necessary to handle very heavy loads with a spooling drum and wherein it is necessary to control the operation of the spooling drum by relatively large brakes which are operable under enormous braking pressures. In view of the particular utility of our invention in the oil producing industry, we will describe our invention as applied to drum constructions such as are used in this industry. It should be clearly understood, however, that our invention is not to be limited in any way by reason of our choosing to describe the invention in connection with the oil producing industry and that during the perusing of the following specification it should be clearly kept in mind that the particular embodiments of our invention described are intended merely to be representative of our invention. Not only is our invention patentable in its entirety, but, so far as we are informed, our invention includes various combinations of elements less than the whole thereof; and it is our intention to cover not only the invention in its entirety but the invention in its sub-combinations and elements.

In order that the advantages of our invention may be clearly understood, we will briefly explain the requirements of the oil producing industry. In the drilling of an oil well the drill pipe is partly supported by a traveling block which in turn is supported by a cable which extends around a crown block mounted in the upper part of the derrick. The cable extends to a draw works which includes a large spooling drum mounted on a rotating shaft and having means whereby the spooling drum may be driven if desired. The spooling drum is provided with a pair of large brakes, one at each end thereof, which are employed during the lowering of the drill pipe into the well for controlling the rotation of the spooling drum. During this time the brakes are called upon to handle very heavy loads, and the heat produced by friction at these times is very great. In order to prevent overheating, it has been proposed to apply circulation passages in the adjacency of the brake drums in order that a cooling medium may be circulated to carry away the heat generated during the braking operation.

It is an object of our present invention to provide a combination which includes means whereby a cooling liquid is circulated through a chamber placed adjacent a brake drum.

It is a further object of our invention to provide a separate cooling system for each brake drum in order that each drum will have a cool liquid supplied thereto.

It is a still further object of our invention to provide a cooling system of the character mentioned in which there is an inlet and an outlet passage formed at one end of the shaft to handle one of the brake drums. If the structure employs a pair of brake drums, such as is ordinarily employed on the spooling drum of the draw works, we then provide an inlet and an outlet at each end of the rotatable shaft. By such an arrangement as this, the cooling system for each brake drum is entirely independent of the cooling system for the other brake drum, and furthermore it is not necessary to provide intercommunicating passages through the shaft or inside the spooling drum.

A further object of our invention is to provide a cooling system in which the rotating structure includes a shaft and a means mounted on the shaft for providing a circulation passage, and in which the shaft provides an inlet and an outlet passage. On the end of the shaft is a body providing passages in communication with the shaft passages, and surrounding the body is a shell which provides an inlet and an outlet chamber in communication with the passages of the body. The shell is stationary and has inlet and outlet pipes connected thereto, and it is rotatably mounted on the body in order that the body and shaft may freely rotate relative thereto.

A still further object of our invention is to provide a novel stuffing box arrangement which constitutes a part of the combination of our invention and which is mounted on the end of the shaft which constitutes a part of the apparatus to which our invention may be applied and which provides a sealing connection between a stationary inlet and outlet means for the cooling system and the shaft through which the inlet and outlet passages of the apparatus are formed.

A further object of our invention resides in the provision of such a stuffing box as pointed out in the foregoing paragraph in which there is a body providing a tubular projection around which a pair of chambers are formed, these chambers being sealed from each other and being sealed in fluid-tight relation with the body.

A still further object of our invention resides in the provision of a stuffing box of the character mentioned heretofore in which the rotatable and non-rotatable parts are readily assembled.

It is a still further object of our present invention to provide an economical and effective means for forming a fluid circulation passage within a brake drum, and a sealing means for forming a seal between the inlet and the outlet of the circulation passage.

Further objects and advantages of our invention are contained in structural details of the apparatus and will be pointed out in the course of the following description.

Referring to the drawings in detail,

Fig. 1 is an end elevational view of an apparatus incorporating the features of our invention.

Fig. 2 is a longitudinal section taken on the line 2—2 of Fig. 1.

Fig. 3 is an enlarged sectional view showing the stuffing box arrangement at one end of the shaft of the apparatus disclosed.

Figure 4:
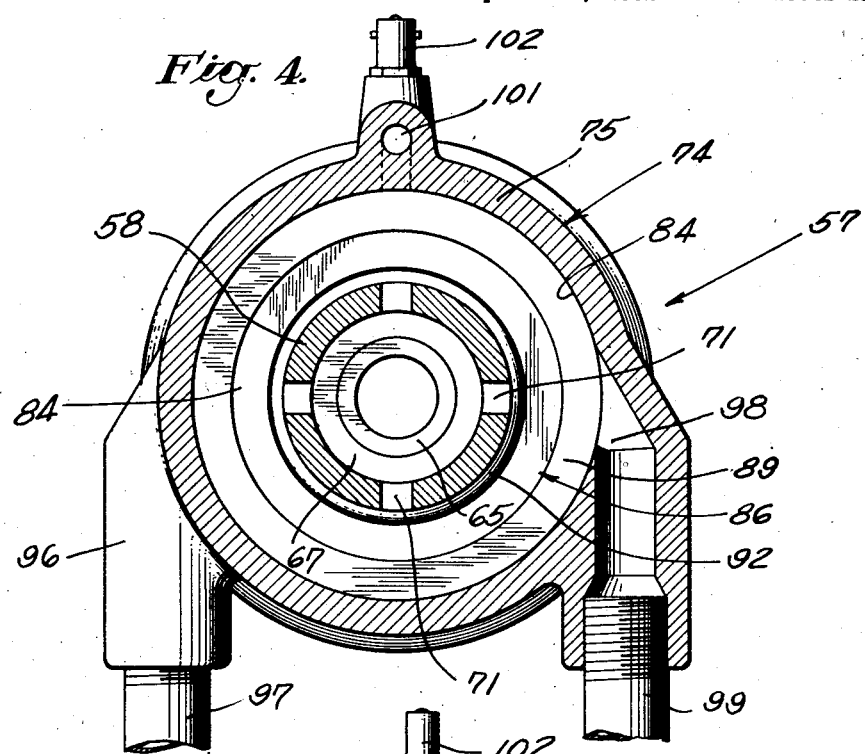
Figure 5:
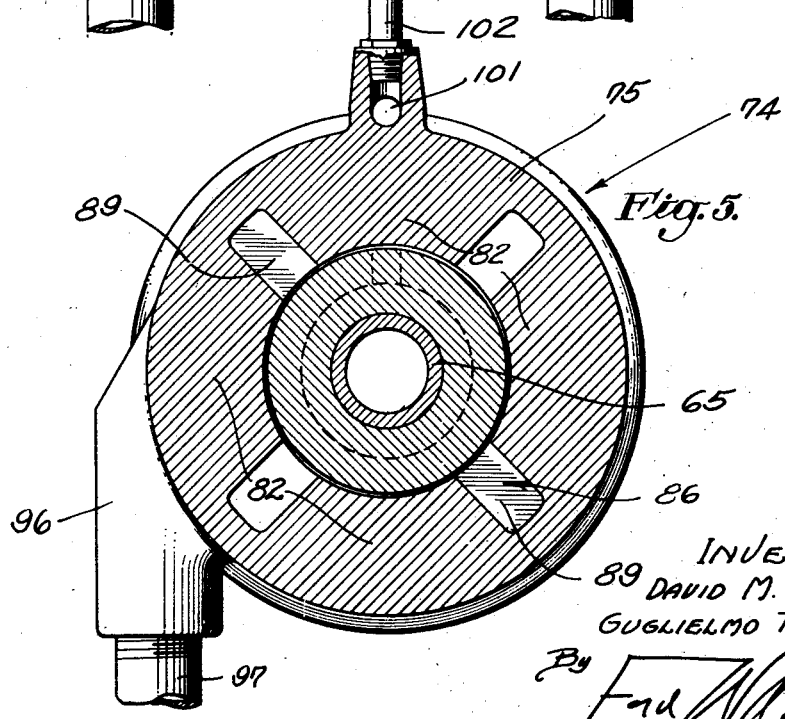

Figs. 4 and 5 are sections taken on the lines 4—4 and 5—5 of Fig. 3.

Fig. 6 is an enlarged fragmentary sectional view showing the structure whereby an opening formed in the shaft of the apparatus is divided into a pair of passages.

Fig. 7 is an enlarged fragmentary sectional view showing the sealing means for forming a seal between the inlet and the outlet of the circulation passage provided within the brake drum.

Fig. 8 is a section taken on the line 8—8 of Fig. 7.

Fig. 9 is a fragmentary sectional view illustrating an alternative form of stuffing box.

Referring to the drawings in detail and particularly Figs. 1 and 2, the numeral 11 represents a pair of posts which constitutes a supporting structure of the invention. Mounted on the posts 11 are bearings 12 which rotatably support a drum shaft 14. Secured on the drum shaft 14 is a spooling drum 15 which may be of the conventional type. Mounted on each end of the spooling drum 15 is a brake drum 16 which, according to usual practice, consists of a cylindrical, outwardly extending wall as disclosed. Placed within each brake drum 16 is a shell 17 which includes a wall spaced inwardly from the brake drum 16 in order to provide an annular circulation passage 18. The inner end of the shell is welded as at 19, while the outer end is welded as at 20 to the brake drum 16 with which it is associated. As disclosed best in Figs. 7 and 8, the shell 17 has an inlet nipple 20 and an outlet nipple 21 connected thereto whereby a cooling liquid may be circulated through the passage 18. Positioned between the inlet and outlet nipples which are positioned quite close to each other, is a sealing means 22 which includes a pair of parallel walls 23 which are secured to the shell 17 and which define a transverse chamber 24. After the metal parts have been assembled in the positions shown in the drawings, a packing 25 is then inserted into this chamber 24 through an opening 26 formed in the shell 17 at the end of the chamber 24. After this packing has been inserted in place, a cover plate 27 is then welded over the opening 26. In this manner it is possible to provide a practically permanent seal without subjecting the packing material to the heat which is created during the welding of the various parts together.

Connected to the nipples 20 and 21 are flexible conduits 28 and 29 which are connected to pipes 30 and 31 respectively. These pipes 30 and 31 are secured to the spooling drum 15 in communication with passages 32 and 33 respectively. The passages 32 and 33 lead to the shaft 14 as shown. The various passages provide a fluid passage through the apparatus to be cooled with the inlet and the outlet thereof adjacent the shaft. The passage 32 constitutes the inlet, while the passage 33 constitutes the outlet.

Formed in each end of the shaft 14 is a shaft opening 36. Each shaft opening 36 extends from one end of the shaft 14 inwardly to a point adjacent the inlet and outlet passages 32 and 33. The inner end of each shaft opening 36 is slightly smaller than the remaining part of each shaft opening and is accurately finished to provide a seat 37. Connected to each shaft opening 36 on the outer side of the seat is an opening 38, and connected to each shaft opening on the inner side of the seat 37 is an opening 39. The openings extend diagonally outwardly at angles to each other, as shown in Fig. 2, and each opening 38 is connected to one of the passages 32, while each opening 39 is connected to one of the passages 33.

Placed in each shaft opening 36 is a tube 41 which is preferably a removable tube. The inner end of each removable tube is provided with an enlargement 42 which is accurately finished to form a sliding fit with the seat 37 with which it is associated. The inner end 43 of each enlargement 42 is tapered for guiding same into one of the seats 37. When each tube 41 has been placed, the shaft opening with which it is associated is divided into an outer shaft passage 46 and an inner shaft passage 47. Each outer shaft passage, it will be seen, is in communication with one of the openings 38, while each inner shaft passage provided within one of the tubes 41 is connected to one of the openings 39. Each of the pairs of outer and inner shaft passages 46 or 47 are separated from each other by one of the enlargements 42 secured to one end of one of the tubes 41.

The outer end of each tube 41 has a plate 49 secured thereto. This plate is received in a countersink 50 formed at one end of the shaft 14, and each plate is secured in place by suitable screw means 51. Each plate has a hub 52 to which one of the tubes 41 is secured. Surrounding each hub 52 are a plurality of openings 54 which are in communication with and form a continuation of one of the outer shaft passages 46.

Secured to each end of the shaft 14 is a stuffing box 57 which constitutes a part of the combination and which of itself incorporates certain patentable features of our invention. As shown best in Fig. 3, each stuffing box is constructed as follows. The numeral 58 represents a tubular projection on the inner end of which there is a radial flange 59 which is secured by suitable bolts 60 to one end of the shaft 14, these parts 58 and 59 constituting a part of the body of the stuffing box. At the inner end of the body is a spider 61 which includes a hub 62 and arms 63 between which there are a plurality of spaces.

Near the central part of the tubular projection 58, which is hollow, is an inwardly extending shoulder 64; and the hub 62 and the shoulder 64 support a longitudinally extending sleeve 65. The openings between the arms 63 are in communication with one of the outer shaft passages 46, and they are also in communication with an outer body passage 66 which is formed in the body around the sleeve 65. The interior of the sleeve 65 is in communication with the interior of one of the tubes 36 and is also in communication with a chamber 67 formed at the left end of the tubular projection 58. The interior of the sleeve 65 and the chamber 67 constitute an inner body passage of the invention. The outer body passage 66 is connected to the exterior of the tubular projection 58 by a plurality of openings 70, and the chamber 67 which constitutes a part of the inner body passage is communicated with the exterior of the tubular projection 58 by a plurality of openings 71.

Surrounding the tubular projection 58 is a stationary shell 74 which includes a cylindrical wall 75. The ends of the cylindrical wall 75 are counterbored, as indicated at 78, to receive ball bearings 79 which are supported by the tubular projection 58. Placed in the counterbores 78 are plates 80 which are cut away at their inner parts to give clearance to the inner bearing race, and threadedly secured to the counterbores 78 on the outside of the bearings 79 are nuts 81 which secure the bearings in the shell 74. Extending inwardly from the central part of the cylindrical wall 75 is a dividing wall in the form of a plurality of spaced fingers 82, as shown. The annular space between the tubular projection 58 and the cylindrical wall 75 is divided into an inlet chamber 83 and an outlet chamber 84, the openings 70 and 71 being connected thereto. The side walls of the chambers 83 and 84 are formed by sealing means 86, each of which is constructed as follows. Each sealing means has a housing 87 including an outer wall 88 and side walls 89 which form an annular chamber 90 which is open at its inner part adjacent the tubular projection 58. Placed in each chamber 90 is a packing member 91 which has an inner lip 92 which is of cylindrical form and which is adapted to engage the outer surface of the tubular projection 58. For the purpose of holding each of the lips 92 in place, each sealing means is provided with a coil spring 94 which rests in the chamber 90 and exerts a constricting force on the lip 92. Each of the packing members 91 is preferably made from a soft leather material or its equivalent which may be rendered pliable by soaking same in oil in order that the lips 92 thereof may be held in fluid-tight engagement with the tubular projection 58 and may move inwardly as wear occurs to compensate for this wear and thus prevent leakage over long periods of time. It will be seen that there is a sealing means disposed on each side of each of the inlet and outlet chambers 83 and 84 and that the lips 92 of the packing members 91 extend inwardly toward the central part of each of the chambers in order that the fluid pressure in each of the chambers assists in holding the lips 92 in fluid-tight engagement with the tubular projection 58. It will further be noted that there is a sealing means 86 positioned adjacent each of the plates 80 and that there is likewise a sealing means disposed on each side of the central wall 82. Formed in the shell 74 in communication with the inlet chamber 83 is an inlet port 96 to which an inlet pipe 97 is secured, and formed on the shell 74 in communication with the outlet chamber 84 is an outlet port 98 to which an outlet pipe 99 is secured.

For the purpose of lubricating the bearings 79, we provide a passage 101 which is connected to the counterbores 78 as disclosed and which is also connected to a suitable grease fitting 102. This means enables the two bearings 79 to be lubricated as desired. In the spaces provided between the fingers 82 we may place a lubricant in the form of a heavy grease which may feed itself to the packing members 91 on each side thereof.

The cylindrical wall 75, the bearings 79, the plates 80, the nuts 81, and the sealing means 86 constitute a part of the shell and are assembled together before the shell is installed on the tubular projection 58 of the body. The housings of the sealing means are preferably a press fit in the cylindrical wall 75 so that they form a more or less rigid part thereof. The entire shell assembly may be removed or installed by moving same axially with respect to the tubular projection 58. During the installing operation and after the shell has been installed in place, as shown clearly in Fig. 3, a cap 105 may then be placed on the end of the tubular projection 58 and secured thereto by a bolt 106, relative rotation between the cap and the tubular projection being prevented by means of a key 107 which fits in a slot provided in the end of the tubular projection 58. The cap 105 has a flange 109 which extends outwardly so as to enclose the adjacent bearings 79 and the nut 81 which locks same in place.

In the operation of our invention a cooling liquid is supplied to each of the inlet pipes 97, which flows inwardly through the wall 75 to the inlet chamber 83. The cooling liquid then passes through the openings 70 into the outer body passages 66, from whence it flows into the outer shaft passages 46. The liquid then flows outwardly through the openings 38 into the passages 32 through the pipes 30, the flexible conduits 28, the nipples 20, and into the circulation passages 18 formed within the brake drums 16 by the shells 17. The liquid then passes almost an entire revolution in each of the circulation passages 18 and then passes therefrom on the opposite side of the sealing means 22 from which it was introduced, being withdrawn through the nipples 21. This liquid passes through the flexible conduits 29, the pipes 31, the passages 30, and into the extreme inner ends of the shaft openings 36. The liquid then passes outwardly through the tubes 41 and into the inner body passage provided by the sleeve 65 and the chamber 67. The liquid then passes outwardly through the openings 71 into the outlet chamber 84 and is then withdrawn through the outlet pipes 99. This circulation of liquid is maintained during the rotation of the shaft 14 and the parts mounted thereon. The body of the stuffing box and the cap 105 rotate with the shaft 14, while the shell which includes the cylindrical wall 75 and the parts associated therewith remain stationary. The packing members 91 are held in engagement with the tubular projection 58 and form a seal so that there will be substantially no leakage from the chambers 83 and 84. As wear occurs due to relative motion between the members 91 and the tubular projection 58, the springs 94 will move the packing members inwardly, thus compensating for the wear.

It will be seen from the foregoing description that in our invention the passages are formed in the shaft 14 only at the ends thereof and that it is not necessary to form passages entirely through the shaft 14 or to provide various conduits extending within the spooling drum 15 from one side to the other. It will further be seen that in our invention the drums 16 are each supplied with a cool liquid, and the circulation passages 18 are not connected in series. By this arrangement both brake drums 16 will be cooled efficiently.

The novel features of our invention reside in the manner in which the passages are formed in the ends of the shaft 14 and the manner in which the rotating parts and the stationary parts are coupled together so that the inlet and outlet passages are maintained separate from each other without leakage. The stuffing box constitutes an important part of the combination and is one of the elements of the entire combination of our invention. In addition, the stuffing box includes novel features of construction which may be used on other apparatus if desired. The manner in which the removable tube 41 is installed in each shaft opening 36 in order to divide the shaft openings 36 into outer and inner shaft passages constitutes an important part of our invention.

In order that it will be clearly seen that our invention is a true combination and is not limited to the details of construction thereof, we have illustrated in Fig. 9 an alternative form of our invention which includes all of the important characteristics of the form of our invention already described, with the exception of a few features residing in the details of construction of the first and preferred form of our invention.

In the form of the invention disclosed in Fig. 9 the shaft 14 is provided with a tubular projection 120 which is an integral part thereof and which provides an inlet opening 122 and an outlet opening 123. A tube 124 which extends through a shaft opening 125 is formed at its inner end in substantially the same manner as the tube 41 of the first described form of our invention, and likewise the inner end of the shaft opening 125 is formed in accordance with the shaft opening 36, this construction being disclosed in Fig. 6. The outer end of the tube 124 is provided with a flange or dam 126 which forms an end wall for the outer shaft passage 128 formed around the tube 124. The tube at its outer end is supported by a plate 130 which may be threadedly or otherwise secured in place, as shown. The tube, at a point outside the dam 126, is provided with an opening 131 whereby communication with the opening 123 is had.

Surrounding the tubular projection 120 is a shell 133 which corresponds to the shell 74 and supports each and every element which is supported by the shell 74. Each of the parts thereof therefore will be identified by the same numeral as employed in Fig. 3 of the drawings. Secured to the end of the tubular projection 120, and in the form disclosed in Fig. 9 to the threaded member 130, is a cap 135 which extends outwardly so as to enclose the outer bearing 79 and the nut 81 which secures same in place.

Upon a comparison of this form of the invention with the first form, it will be clearly obvious that the various features of the later described form of our invention correspond to the features of the preferred form of our invention disclosed in Figs. 1 to 8 inclusive.

As we have stated heretofore, we do not wish our invention to be limited to the details of construction disclosed herein but intend our invention to be broadly construed in accordance with the spirit and scope thereof and in accordance with the appended claims which define our invention.

We claim as our invention:

1. In a brake drum assembly of the class described, the combination of: a shaft; a brake drum means secured to said shaft and providing a fluid passage, the inlet and the outlet ends thereof being adjacent said shaft; walls defining a shaft opening in said shaft from one end thereof, having a seat therein, and openings connecting to said shaft openings on opposite sides of said seat, one being connected to said inlet end and the other to said outlet end; a tube inserted into said shaft opening having the end thereof prepared for engagement with said seat, said tube dividing said shaft opening into an inlet shaft passage and an outlet shaft passage, one of which is around said tube and the other of which is within said tube; a body secured to the end of said shaft having inner and outer body passages which are in communication with said inlet and outlet shaft passages; and a shell surrounding said body and providing an inlet and an outlet chamber in communication with said inner and outer body passages, said body being rotatable within said shell.

2. In a brake drum assembly of the class described, the combination of: a shaft; brake drum means secured to said shaft and providing a fluid passage, the inlet and the outlet ends thereof being adjacent said shaft; walls defining a shaft opening in said shaft from one end thereof, having a seat therein, and openings connecting to said shaft opening on opposite sides of said seat, one being connected to said inlet end and the other to said outlet end; a tube inserted into said shaft opening having the end thereof prepared for engagement with said seat, said inner end of said tube being slidably supported by said seat, and said tube dividing said shaft opening into an inlet shaft passage and an outlet shaft passage, one of which is around said tube and the other of which is within said tube; and means providing an inlet and an outlet passage in communication with said shaft inlet and outlet passages.

3. In a brake drum assembly of the class described, the combination of: a shaft; brake drum means secured to said shaft and providing a fluid passage, the inlet and the outlet ends thereof being adjacent said shaft; walls defining a shaft opening in said shaft from one end thereof, having a seat therein, and openings connecting to said shaft opening on opposite sides of said seat, one being connected to said inlet end and the other to said outlet end; a tube inserted into said shaft opening having an enlargement on the end thereof for engagement with said seat, said tube dividing said shaft opening into an inlet shaft passage and an outlet shaft passage, one of which is around said tube and the other of which is within said tube; a plate secured to the outer end of said tube and held against the end of said shaft, said plate having an inner opening communicating with and forming a part of the shaft passage formed through said tube and having an outer passage communicating with and forming a part of the shaft passage around said tube; and means providing an inlet and an outlet passage in communication with said shaft inlet and outlet passages.

4. In a brake drum assembly of the class described, the combination of: a shaft; brake drum means secured to said shaft and providing a fluid passage, the inlet and the outlet ends thereof being adjacent said shaft; walls defining a shaft opening in said shaft from one end thereof, having a seat therein, and openings connecting to said shaft opening on opposite sides of said seat, one being connected to said inlet end and the other to said outlet end; a tube inserted into said shaft opening having an enlargement on the end thereof for engagement with said seat, said tube dividing said shaft opening into an inlet shaft passage and an outlet shaft passage, one of which is around said tube and the other of which is within said tube; a plate secured to the outer end of said tube and held against the end of said shaft, said plate having an inner opening communicating with and forming a part of the shaft passage formed through said tube and having an outer passage communicating with and forming a part of the shaft passage around said tube; a body secured to the end of said shaft having inner and outer body passages which are in communication with said inlet and outlet shaft passages, said plate being secured in place by said body; and a shell surrounding said body and providing an inlet and an outlet chamber in communication with said inner and outer body passages, said body being rotatable within said shell.

5. In an apparatus requiring fluid to be circulated therethrough, the combination of: a shaft providing an inlet shaft passage and an outlet shaft passage, both communicating with the end of said shaft; structure carried by said shaft providing a circulation passage connected to said inlet and outlet shaft passages; a body on the end of said shaft providing an inlet body passage and an outlet body passage in communication with said inlet and outlet shaft passages; a shell surrounding said body, having walls defining an inlet and an outlet chamber in communication with said inlet and said outlet body passages; sealing means for forming seals between said shell and said body; and bearing means for supporting said shell on said body.

6. In an apparatus requiring fluid to be circulated therethrough, the combination of a shaft providing an inlet shaft passage and an outlet shaft passage, both communicating with the end of said shaft; structure carried by said shaft providing a circulation passage connected to said inlet and outlet shaft passages; a body on the end of said shaft providing an inlet body passage and an outlet body passage in communication with said inlet and outlet shaft passages; a shell surrounding said body; bearing means for supporting said shell on said body; annular members secured in said shell for dividing same into an inlet and an outlet chamber in communication with said inlet and outlet body passages; and sealing means carried by said annular members in sealing engagement with said body.

DAVID M. SMITH.
GUGLIELMO TREMOLADA.